United States Patent [19]

Cunningham

[11] 4,098,317
[45] Jul. 4, 1978

[54] TIRE CHANGING APPARATUS

[75] Inventor: Charles L. Cunningham, Nashville, Tenn.

[73] Assignee: The Coats Company, Inc., La Vergne, Tenn.

[21] Appl. No.: 703,682

[22] Filed: Jul. 8, 1976

[51] Int. Cl.² .................................................. B60C 25/06
[52] U.S. Cl. ................................................... 157/1.24
[58] Field of Search ......................... 157/1.17, 1.24, 1.26

[56] References Cited

U.S. PATENT DOCUMENTS

| | | | |
|---|---|---|---|
| 1,651,389 | 12/1927 | Heineke | 157/1.26 |
| 2,471,642 | 5/1949 | Moltz | 157/1.24 X |
| 2,598,793 | 6/1952 | Helton | 157/1.17 |
| 2,708,954 | 5/1955 | Schultz | 157/1.26 X |
| 2,895,519 | 7/1959 | Coats | 157/1.26 X |
| 3,211,206 | 10/1965 | Garthe | 157/1.24 |

Primary Examiner—James L. Jones, Jr.
Assistant Examiner—James G. Smith
Attorney, Agent, or Firm—Wegner, Stellman, McCord, Wiles & Wood

[57] ABSTRACT

An improved tire changing apparatus including a base provided with an elevated tire supporting surface. An arm has one end pivoted to the base and a bed breaker tool receiving structure adjacent its opposite end. A pawl is disposed intermediate the ends of the arms and a ratchet having plural teeth is pivoted to the base above the arm and below the tire supporting table and depends in adjacency to the arm so that the pawl may selectively engage any one of the teeth to adjust the position of the tool receiving formation relative to the support surface.

5 Claims, 2 Drawing Figures

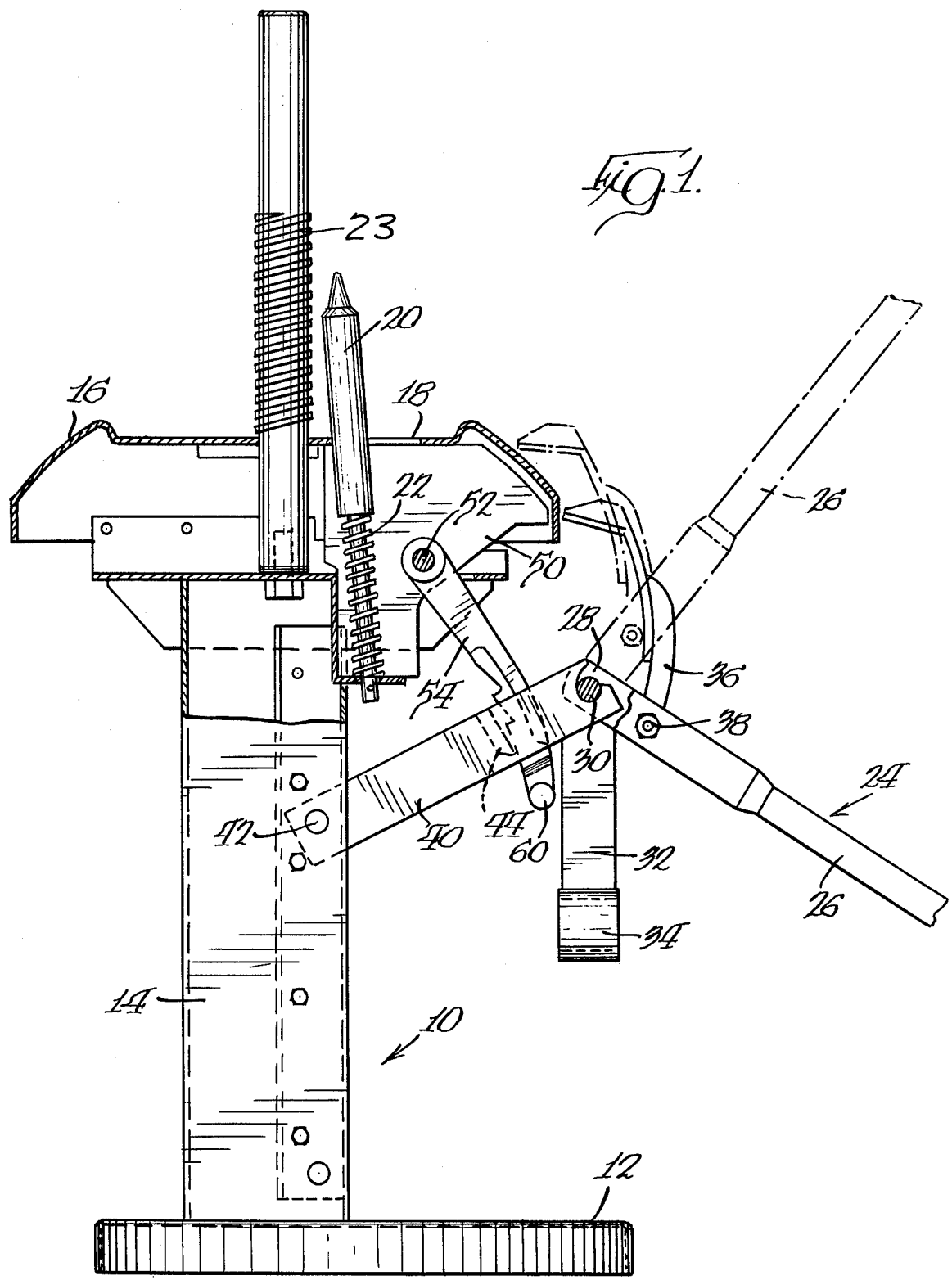

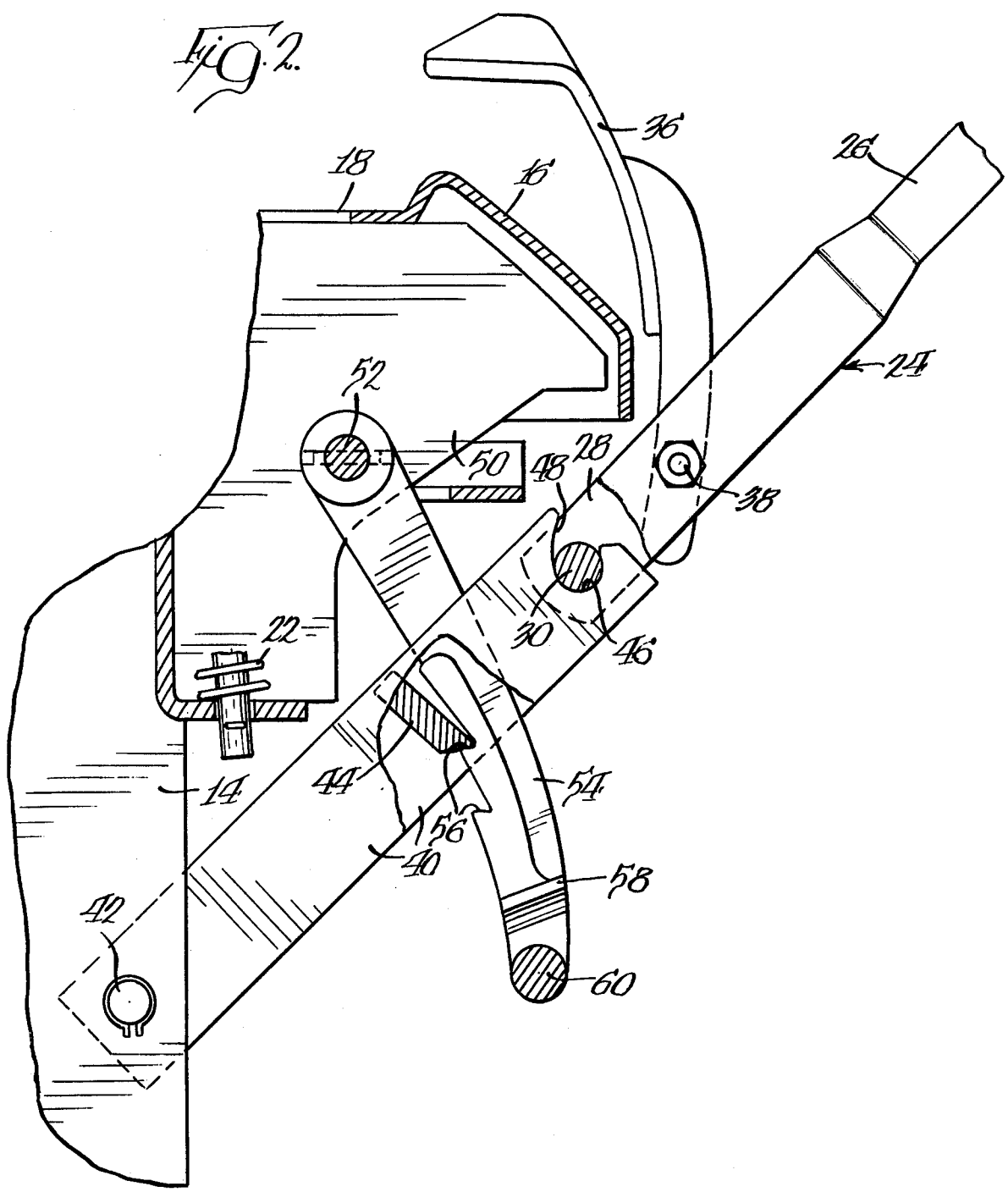

TIRE CHANGING APPARATUS

BACKGROUND OF THE INVENTION

This invention relates to tire changing apparatus, and more specifically, to tire changing apparatus of the type employing manual, lower bead breaking devices.

Because of the expense involved in purchasing various types of the relatively sophisticated tire changing apparatus available on the market today, many operators of facilities having a relatively low volume of tire changing work prefer inexpensive tire changing apparatus of the type wherein manually operated tools are employed in the bead breaking operation. In most such tire changing apparatus, one tool is used interchangeably for breaking both the upper and lower beads. The typical tool is quite efficient at breaking the upper bead but in many instances, may not have sufficient throw with respect to its point of attachment to the apparatus to break the lower bead.

SUMMARY OF THE INVENTION

It is a principal object of the invention to provide a new and improved tire changing apparatus of the type utilizing a manually operated tool for breaking the beads on tires. More specifically, it is an object of the invention to provide such an apparatus wherein the position of the bead breaking tool, when oriented on the apparatus for breaking the lower bead of a tire may be easily adjusted with a minimum of effort so that there will be sufficient throw of the tool to reliably break the lower beads on a wide variety of tire and rim combinations.

An exemplary embodiment of the invention achieves the foregoing object in a tire changing apparatus including a base and an elevated tire supporting means mounted thereon. The apparatus includes an arm having one end pivoted to the base and a bead breaker tool receiving means adjacent the opposite end. A pawl is disposed on the arm intermediate its ends and a ratchet having plural teeth is pivoted to the base above the arm and below the tire supporting means. The ratchet depends in adjacency to the arm so that the pawl may selectively engage any one of the teeth to adjust the position of the tool receiving means relative to the supporting means.

In a highly preferred embodiment, the tool receiving means includes a notch for pivotally receiving a pin on a bead breaker tool. The notch opens diagonally upwardly and toward the aforementioned opposite end of the arm.

In a highly preferred embodiment, the notch includes a partial hook formation on its upper edge so that the bead breaker tool may be lowered below the arm to impart an upwardly directed force thereto to cause the upward pivotal movement of the arm to a higher position of adjustment relative to the tire supporting means without removing the tool from the arm.

In a highly preferred embodiment, there are two of such arms disposed in parallel relation and the pawl extends between the arms. The ratchet is also located between the arms.

In one embodiment contemplated, the ratchet has its teeth on the side thereof nearest the base and includes a handle at its lowermost end so that the same may be easily manipulated.

Other objects and advantages will become apparent from the following specification taken in connection with the accompanying drawings.

DESCRIPTION OF THE DRAWINGS

FIG. 1 is a side elevation of a tire changing apparatus made according to the invention with parts broken away for clarity;

FIG. 2 is an enlarged, fragmentary view of a part of the tire changing apparatus.

DESCRIPTION OF THE PREFERRED EMBODIMENT

An exemplary embodiment of a tire changing apparatus made according to the invention is illustrated in FIG. 1 and is seen to include a base, generally designated 10 including a bottom or floor plate 12 and an upstanding post 14. At the upper end of the post 14, the same mounts a tire receiving table 16. The table 16 includes an elongated opening 18 in the upper side thereof through which a prong 20 extends. The prong 20 may be disposed in a lug receiving hole in a wheel disposed on the table to preclude the wheel from rotating during a tire changing operation. The prong 20 is biased upwardly by a spring 22 in a conventional fashion.

Extending upwardly from the center of the wheel receiving table 16 is a threaded post 23 upon which the wheel may be impaled. Suitable threaded clamping means (not shown) cooperate with the threads on the post 23 for firmly holding the tire in place on the table.

Generally, a bead breaking tool such as the bead breaking tool generally designated 24 will be utilized in connection with the tire changing apparatus. The same includes a handle 26. At the end 28 of the tool opposite from the handle 26, the same includes a pivot pin 30. A link 32 is pivoted to the end 28 by the pivot pin 30 and at its end remote from the pivot pin 30 mounts a sleeve 34 which is dimensioned so as to be receivable upon the post 18.

Intermediate the end 28 and the handle 26, a bead breaking shoe 36 is pivotally mounted as at 38 to the tool 24.

As is well known, when the upper bead is to be broken, the collar 34 is disposed about the post 23 with the bead breaking shoe 36 depending from the handle 26. The bead breaking shoe 36 is located adjacent to the bead on a tire and upon the application of sufficient downward pressure to the handle 26, the upper bead will be broken.

When the lower bead is to be broken, the link 32 and sleeve 34 are unused and the tool is oriented generally in the position illustrated in FIG. 1 with the bead breaker shoe 36 extending upwardly. The same is then located adjacent the bead with the end 28 secured, by some suitable means, to the tire changing apparatus. Upon the application of sufficient upward pressure on the handle 26, the lower bead will be broken. However, in some instances, for any of a variety of reasons, there is insufficient upward movement, or "throw" of the bead breaker shoe 36 to break the bead, particularly on relatively small diameter rims, or with extremely wide tires. In such a case, it is necessary to elevate the point of attachment of the tool 26 to the apparatus.

The present invention contemplates unique, easily useable means for the purpose.

In particular, a pair of parallel spaced arms 40 are pivoted as at 42 to the base 10, and specifically, the post 14, below the table 16. As best seen in FIG. 2, a pawl 44 extends between the arms 40 and is secured thereto by any suitable means as, for example, by welding.

The ends of the arms 40 opposite from the pivot pin 42 have bead breaker tool receiving means formed therein in the form of a notch 46. The notches 46 in the arms 40 open upwardly and diagonally toward the end of the arms 40 opposite the pivot pin 42 and as best seen in FIG. 2 include a partial hook formation 48 at their upper ends. Notches 46 are adapted to pivotally receive the pivot pin 30 of the tool 24.

The upper end of the post 14, just below the table 16, includes a lateral extension 50 mounting a pivot pin 52. The upper end of a ratchet 54 is pivoted to the base by the pivot pin 52 so as to depend therefrom. As seen in FIG. 2, the ratchet 54 includes plural, upwardly opening teeth 56. Below the teeth 56 is a lateral extension 58 and a depending handle 60. The teeth 56 and the extension 58 cooperate with the pawl 44 and the undersides of the arms 40, respectively, to position the arms 40 at some desired angular relation about the pivot pin 42 and thereby control the height of the tool receiving notches 46 and thus the maximum uppermost position of the bead breaker shoe 36.

In general, it is desired that the teeth 56 be located on the side of the ratchet 54 nearest to the post 14 and that the pivot pin 52 be located nearer to the post 14 than the nearest contemplated position of the nose 58 of the pawl 44 to the post 14. When such a relation is employed, gravity will always tend to cause the ratchet to pivot into engagement with the pawl eliminating any need for additional parts, such as biasing springs, or additional effort on the part of the operator in terms of manually engaging the ratchet 54 with the pawl 44.

In general, the apparatus will be used as follows. The handle 60 is grasped and the ratchet 54 pivoted in a counterclockwise direction as viewed in the figures. The arms 40 will then descend about pivot point 42 until they engage in the extensions 58 which serve to prevent the arms 40 from striking the fingers of the operator engaging the handle 60. The pivot pin 30 of the tool 24 may then be inserted in the notches 46 and upward pressure applied to the handle 26 to break the lower bead. If there is insufficient movement permitted to break the lower bead, the operator need only lower the handle 26 to the solid line position illustrated in FIG. 1 and push axially on the handle 26. The presence of the partial hook 46 precludes disengagement of the pin 30 from the notches 46 so that the axial force will cause counterclockwise rotation of the arms 40 about the pivot 42. As a consequence, the pawl 44 will be moved upwardly on the ratchet 54. When pressure is relieved, the arms 40 will descend until the nose 58 of the pawl 44 engages one of the teeth 56 thereby precluding further downward movement of the arms 40. As a consequence, the position of the notches 46 will be elevated thereby increasing the height of the path of travel of the bead breaker shoe 36. Upward pressure may then be applied to the handle 26 to break the bead.

From the foregoing, it will be appreciated that the tire changing apparatus made according to the invention may be easily utilized by an operator and requires little or no time and effort to adjust the position of the tool during lower bead breaking operations when there is insufficient throw.

I claim:

1. For use in a tire changing apparatus,
 a base;
 elevated tire supporting means mounted on said base;
 an arm having one end pivoted to said base, bead breaker tool receiving means adjacent its opposite end, and a pawl intermediate its ends; and
 a ratchet having upwardly opening plural teeth pivoted to said base above said arm and below said supporting means and depending in adjacency to said arm so that said pawl may selectively engage any one of said teeth to adjust the position of said tool receiving means relative to said supporting means.

2. The device of claim 1 wherein said tool receiving means includes a notch for pivotally receiving a pin on a bead breaker tool, said notch opening diagonally upwardly and toward said arm opposite end.

3. The device of claim 2 wherein said notch includes a partial hook formation on its upper edge.

4. The device of claim 1 wherein there are two said arms in parallel relation, said pawl extending between said arms, and said ratchet being located between said arms.

5. The device of claim 1 wherein said ratchet has said teeth on the side thereof nearest said base and includes a handle at its lowermost end.

* * * * *